United States Patent [19]
Matthews et al.

[11] Patent Number: 5,514,417
[45] Date of Patent: May 7, 1996

[54] METHOD OF AND APPARATUS FOR COATING A MOLDED FIBROUS WORKPIECE

[75] Inventors: Kent R. Matthews, Littleton; Eric G. Schakel, Sedalia, both of Colo.; Lowell K. Morton; James F. Young, both of Greenville, S.C.

[73] Assignee: Schuller International, Inc., Denver, Colo.

[21] Appl. No.: 286,027

[22] Filed: Aug. 4, 1994

[51] Int. Cl.[6] .................................. B05D 3/12; B05D 1/18
[52] U.S. Cl. ...................... 427/358; 427/368; 427/434.7; 427/434.4; 427/430.1
[58] Field of Search .................. 427/358, 434.4, 427/434.7, 369, 243, 371, 430.1, 296, 434.5, 368

[56] References Cited

U.S. PATENT DOCUMENTS

| | | | |
|---|---|---|---|
| 1,849,369 | 3/1932 | Frost | 427/243 |
| 2,414,125 | 1/1947 | Rheinfrank, Jr. | 427/369 |
| 3,733,216 | 5/1973 | Goldman et al. | 427/434.7 |
| 4,086,377 | 4/1978 | Barchi | 427/358 |
| 4,265,965 | 5/1981 | Chancler | 427/369 |
| 4,327,130 | 4/1982 | Pipkin | 427/369 |
| 4,590,099 | 5/1986 | Reith | 427/434.4 |
| 4,597,831 | 7/1986 | Anderson | 427/358 |
| 4,613,524 | 9/1986 | Walles | 427/243 |
| 4,643,126 | 2/1987 | Wilkinson et al. | 427/434.4 |
| 4,792,481 | 12/1988 | O'Conner et al. | 427/178 |
| 4,808,439 | 2/1989 | Basfeld | 427/358 |
| 4,863,761 | 9/1989 | Puri | 427/358 |
| 5,002,712 | 3/1991 | Goldmann et al. | 427/358 |
| 5,104,698 | 4/1992 | Hayashi et al. | 427/434.4 |
| 5,376,412 | 12/1994 | Najotte et al. | 427/358 |
| 5,407,616 | 4/1995 | Dube | 427/358 |
| 5,425,967 | 6/1995 | Tomaru | 427/358 |

FOREIGN PATENT DOCUMENTS

| | | | |
|---|---|---|---|
| 760935 | 6/1967 | Canada | 427/358 |

*Primary Examiner*—Diana Dudash
*Attorney, Agent, or Firm*—Cornelius P. Quinn

[57] ABSTRACT

Molded fibrous workpieces of various cross sectional configurations are coated with a polymeric latex foam coating material to encapsulate fibers and dust within the exterior surfaces of the workpieces. The foam coating is applied by passing the workpieces through a coating chamber filled with the polymeric foam so that the workpieces are totally immersed in the foam coating as the workpieces pass through the chamber. Openings for introducing the workpieces into and discharging the workpieces from the chamber have a configuration complementary to the transverse configuration of the workpieces. The foam coating is introduced into the chamber both above and below the path of the workpieces through the coating chamber to assure that the coating chamber remains fully charged with the foam coating. Brushes or wiper blades spread the foam coating over the exterior surfaces of the workpieces.

5 Claims, 2 Drawing Sheets

METHOD OF AND APPARATUS FOR COATING A MOLDED FIBROUS WORKPIECE

BACKGROUND OF THE INVENTION

The present invention is directed to a method of and an apparatus for coating the exterior surfaces of molded fibrous workpieces with a polymeric coating to encapsulate dust and fibers within the surfaces of the workpiece.

Molded fibrous workpieces, such as, glass fiber turning vanes used in heating, ventilating and air conditioning systems; glass, ceramic or mineral wool fiber pipe insulations; T-12 fibrous insulation; and other fibrous workpieces may have loose fibers and/or dust in their exterior surfaces. To improve the handleability of these various types of molded fibrous workpieces and, in the case of glass fiber turning vanes, to improve the acoustical performance of the workpieces when placed in heating, ventilating and air conditioning systems, the exterior surfaces can be coated. The coating, if properly applied, encapsulates any dust and loose fibers within the surface of the workpiece.

Presently, these workpieces are coated by hand spraying the coating material onto the exterior surfaces of the workpieces. This type of a coating operation is labor intensive and often results in a waste of coating material when to much coating material is applied to certain portions of the workpieces. In addition, when a coating is applied by hand spraying the coating material onto the workpiece, it is difficult to obtain a smooth, evenly distributed coating on the surface of the workpiece or to even determine whether or not the coating operation has provided a coating that completely covers the entire exterior surface of the workpiece. Thus, there has been a need to provide a simple, yet effective and efficient, method of and apparatus for coating such molded fibrous workpieces that applies a smooth, evenly distributed coating over the entire exterior surface of these workpieces and encapsulates dust and loose fibers within the exterior surfaces of the workpieces.

SUMMARY OF THE INVENTION

The method and apparatus of the present invention for applying a polymeric foam coating to the exterior surfaces of molded fibrous workpieces solves the problems of the prior art by providing a simple, efficient, cost effective and reliable means for coating the exterior surfaces of molded fibrous workpieces. In the method and apparatus of the present invention, molded fibrous workpieces are passed through a coating chamber containing a polymeric foam coating material. The coating chamber is provided with inlet and outlet openings having configurations which are complementary to the transverse cross sectional configuration of the molded fibrous workpieces being coated. Thus, the inlet and outlet openings can function to both guide the workpieces through the coating chamber and to minimize the leakage of foam coating material from the coating chamber.

The polymeric foam coating material is introduced into the upper and lower portions of the coating chamber by foam supply nozzles located in the upper and lower portions of the coating chamber above and below the path of travel of the workpieces through the coating chamber. Thus, both the upper and lower portions of the coating chamber are continuously charged with the polymeric foam thereby fully immersing the molded fibrous workpieces in the polymeric foam coating material as the workpieces pass through the coating chamber.

The polymeric foam coating material applied to the exterior surfaces of the molded fibrous workpieces, as the workpieces pass through the coating chamber, is evenly distributed over the exterior surfaces of the workpieces by a set of wiper blades or brushes located within the coating chamber. The wiper blades or brushes have edges for contacting the exterior surfaces of the molded fibrous workpieces which are complementary in configuration to the transverse configuration of the workpieces. Preferably, a second set of wiper blades or brushes are located outside of the coating chamber and adjacent the outlet opening of the coating chamber. The second set of wiper blades or brushes have edges for contacting the exterior surfaces of the molded fibrous workpieces which are complementary in configuration to the transverse cross section of the workpieces, The second set of wiper blades or brushes smooth out the surfaces of the polymeric coating as the workpieces exit the coating chamber.

DESCRIPTION OF THE PREFERRED EMBODIMENTS

Figures 1, 6:
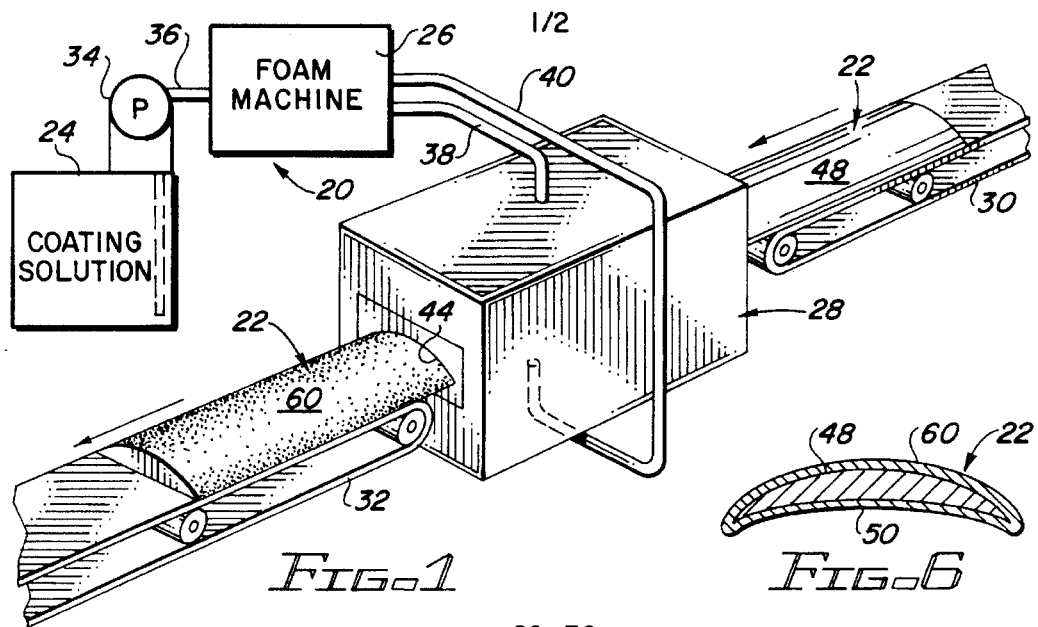
FIG. 1 is a schematic perspective view of the foam coating apparatus of the present invention with inlet and outlet openings configured for coating turning vanes and with the downstream brushes or wiper blades adjacent the outlet opening omitted to show the outlet opening.
FIG. 6 is a transverse section of a turning vane coated by the method and apparatus of the present invention.

FIG. 1 shows the foam coating apparatus 20 of the present invention coating a molded fibrous workpiece 22. The apparatus comprises a liquid polymeric coating feed tank 24, a foam generator 26, a coating chamber 28, and workpiece conveyors 30 and 32. The liquid polymeric coating feed tank 24 contains the coating material to be applied to the workpiece 22. Typically, the coating material is a polymeric latex coating, such as, an Evode-Tanner XA 9900 Series polymeric latex coating. A pump 34 conveys the liquid polymeric latex coating to the foam generator 26 through a supply line 36 where the liquid polymeric latex coating is mixed with pressurized air to form a polymeric latex foam coating material having a consistency that approximates the consistency of shaving cream. The polymeric foam coating material is conveyed from the foam generator 26 to the coating chamber 28, under pressure, through a pair of foam supply lines 38 and 40. The foam generator is a conventional, commercially available foam generator, such as, a Model E-1000 foam generator manufactured by Ease Inc. of Dalton, Ga.

Figure 2:
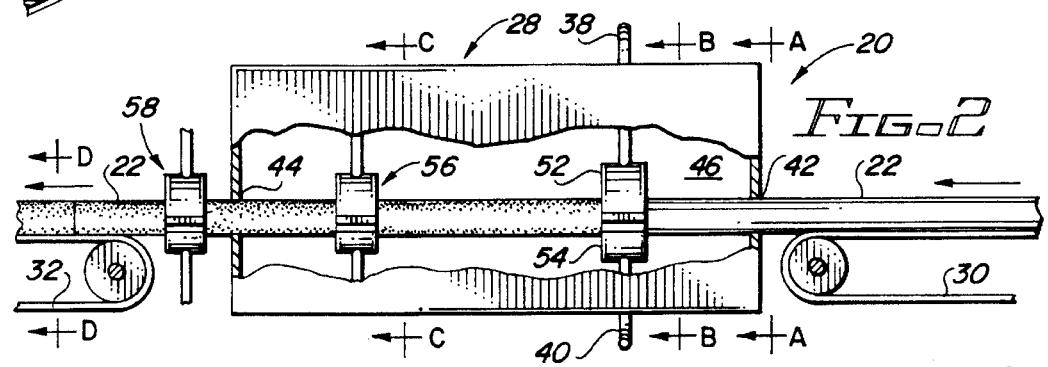
FIG. 2 is a schematic side elevation of the foam coating apparatus of the present invention with portions broken away to show the location of the foam supply nozzles within the coating chamber and the wiper blades or brushes both within and outside of the coating chamber.
Figures 3, 4, 5:
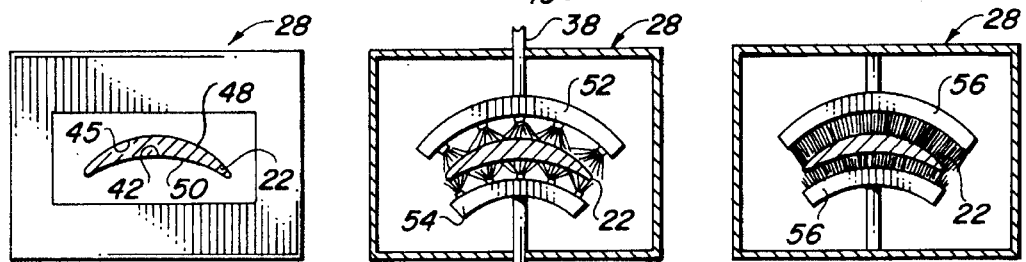
FIG. 3 is a section taken substantially along lines A—A of FIG. 2 to illustrate the workpiece inlet opening used when coating a turning vane having an arcuate transverse cross section.
FIG. 4 is a section taken substantially along lines B—B of FIG. 2 to illustrate an arrangement of the polymeric foam coating supply nozzles for coating a turning vane.
FIG. 5 is a section taken substantially along lines C—C of FIG. 2 to illustrate an arrangement of the wiper blades or brushes within the coating chamber when coating a turning vane.

As shown in FIGS. 1, 2 and 3, the coating chamber 28 is provided with an inlet opening 42 and an outlet opening 44 through which the molded fibrous workpieces 22, such as glass fiber turning vanes, pass into and out of the coating chamber. The inlet opening 42 and the outlet opening 44 have the same shape and dimensions. The sheet metal edges 45 of the inlet and outlet openings 42 and 44 are rounded or encased in a rubber gasket to ensure that the workpieces 22 are not damaged or caught on any edge of the openings as the workpieces pass into and out of the coating chamber. As shown in FIGS. 1 and 3, the inlet opening 42 and the outlet opening 44 each conform to the transverse cross sectional configuration of the exterior surfaces of the workpieces 22 being coated and have dimensions substantially the same as but somewhat greater than the transverse dimensions of the exterior surfaces of the workpieces. Thus, any leakage of the foam coating material 46 from within the coating chamber out through the inlet and outlet openings is minimized. In addition, the spacing between the inlet opening and the outlet opening relative to the lengths of the molded fibrous workpieces 22, such as the glass fiber turning vanes, passing through the coating chamber is such that the inlet and outlet openings function as guides for the workpieces to maintain the workpieces in proper alignment with the foam coating application nozzles and the wiper blades or brushes as the workpieces pass through the coating chamber 28.

As shown in FIGS. 2 and 4, the coating chamber 28 is provided with upper and lower sets of foam supply nozzles 52 and 54 for introducing the polymeric latex foam coating material 46 into the upper and lower portions of the coating chamber at locations above and below the path of the workpieces 22 through the coating chamber. Thus, the coating chamber is maintained fully charged with the polymeric latex coating material 46 and the workpieces 22 are thereby totally immersed within the foam coating material as the workpieces pass through the coating chamber so that both the upper and lower surfaces 48 and 50, respectively, of the workpieces are thoroughly coated with a layer of the polymeric latex foam. The upper set of foam supply nozzles 52 is supplied with the foam coating material through supply line 38 and lower set of supply nozzles 54 is supplied with foam coating material through supply line 40. As shown in FIG. 4, the sets of foam supply nozzles 52 and 54 are mounted in configurations that generally conform to the contours of the upper and lower exterior surfaces 48 and 50 of the workpieces 22 to facilitate the application of the foam coating material 46 to the surfaces of the workpieces. However, a single upper and a single lower nozzle can also be used to charge the upper and lower portions of the coating chamber with the foam coating material or the sets of foam supply nozzles 52 and 54 can be arranged in other configurations which assure delivery of the foam coating material 46 to both the upper and lower portions of the coating chamber 28 so that the workpieces 22 are fully immersed within the foam coating material as the workpieces pass through the coating chamber.

FIG. 5 shows a first set of brushes 56, with flexible plastic or wire bristles, located within the coating chamber 28 downstream of the foam supply nozzles 52 and 54 and adjacent the outlet opening 44. As discussed above, the polymeric latex coating material 46 within the coating chamber has a consistency approximating the consistency of shaving cream. The free edges of the upper and lower sets of brushes 56 have configurations which are complementary to the transverse cross sectional configuration of the workpieces 22 and engage the exterior surfaces 48 and 50 of the workpieces to disperse or spread the polymeric latex foam coating material over the entire permeable exterior surfaces of the workpieces. While brushes are shown in FIG. 5 for dispersing or spreading the foam coating material over the permeable exterior surfaces of the workpieces 22, flexible wiper blades made of rubber or a similar material and having contours complementary to the transverse cross sectional configuration of the workpieces can be used in place of the brushes 56 to spread or disperse the polymeric latex foam coating material over the permeable exterior surfaces of the workpieces.

A second set of brushes or wiper blades 58 is located outside of the coating chamber 28 and adjacent the outlet opening 44. The brushes or wiper blades 58 are the same as the wiper blades or brushes 56 shown and described in connection with FIG. 5. Accordingly, the description will not be repeated. The second set of brushes or wiper blades 58 functions to smooth out the surface of the polymeric latex coating 60 on the permeable exterior surfaces 48 and 50 of the molded fibrous workpiece 22.

FIG. 6 shows a transverse cross section of a molded fibrous turning vane 22 which has been coated by the method and with the apparatus of the present invention as illustrated in and described in connection with FIGS. 1 to 5. The molded fibrous turning vane 22 is preferably made of glass fibers. However, it is contemplated that other fibrous materials can be used, such as, ceramic fibers or mineral wool fibers. As shown, the glass fiber turning vane 22 has a smooth, uniform polymeric latex coating 60 over both the upper permeable surface 48 and the lower permeable surface 50 to encapsulate any loose fibers and/or dust within the exterior surfaces of the turning vane.

Figures 7, 8, 9:
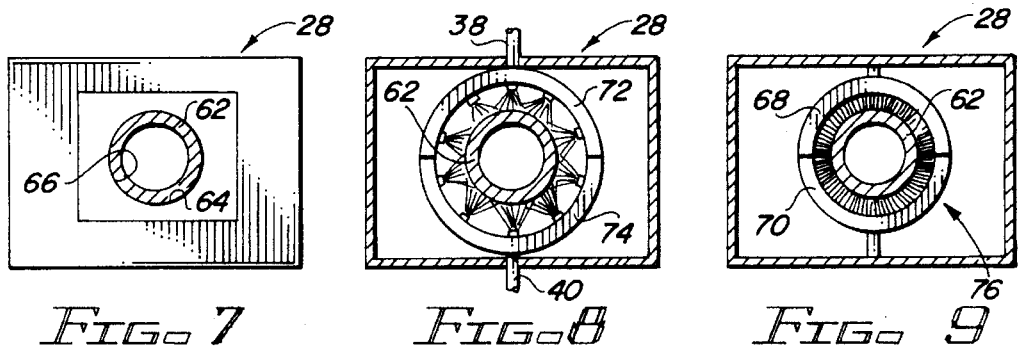
FIG. 7 is a section taken substantially along lines A—A of FIG. 2 to illustrate the inlet opening used when coating a workpiece having a circular cross section.
FIG. 8 is a section taken substantially along lines B—B of FIG. 2 to illustrate an arrangement of the polymeric foam coating supply nozzles for a workpiece having a circular cross section.
FIG. 9 is a section taken substantially along lines C—C of FIG. 2 to illustrate an arrangement of the wiper blades or brushes within the coating chamber when coating a workpiece having a circular cross section.
Figure 10:
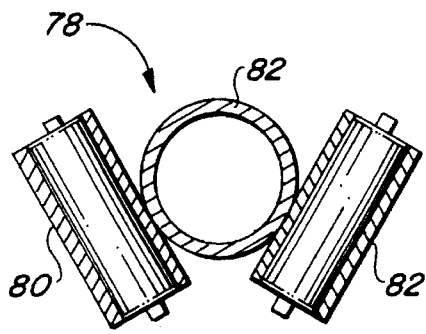
FIG. 10 is a section taken substantially along lines D—D of FIG. 2 to illustrate a conveyor arrangement for taking a workpiece having a circular transverse cross section away from the coating chamber.
Figure 11:
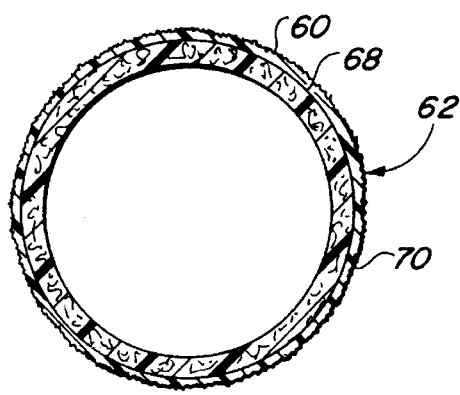
FIG. 11 is a transverse cross section of a workpiece having a circular cross section that has been coated by the method and apparatus of the present invention.

FIGS. 7 to 10 show the coating chamber 28 of FIG. 1 modified to coat workpieces having circular cross sections, such as, the pipe insulation 62 of FIG. 11. As shown in FIG. 7, the inlet opening 64 of the coating chamber 28 has a circular configuration. The sheet metal edges 66 defining the inlet opening 64 are rounded or encased in an annular rubber gasket to ensure that the pieces of pipe insulation 62 are not damaged by or caught on the edges of the opening as the pieces of pipe insulation pass through the inlet opening into the coating chamber 28. The outlet opening (not shown) has the same configuration and dimensions as the inlet opening 64 and like the inlet opening 64, the edges of the outlet opening are either rounded or provided with a gasket so that the pieces of pipe insulation 62 are not damaged by or caught on the edges as the pieces of pipe insulation pass through the outlet opening. The inlet opening 64 and the outlet opening conform to the transverse configuration of the exterior surfaces of the pipe insulation pieces 62 with a diameter substantially the same as but somewhat greater than the diameters of the pieces of pipe insulation 62. Thus, as with the embodiment of FIGS. 1 to 5, any leakage of the polymeric latex foam coating material 46 out through the inlet opening 64 or the outlet opening is minimized. In addition, the spacing between the inlet opening and the outlet opening relative to the lengths of the pieces of pipe insulation 62 passing through the coating chamber is such that the inlet opening and the outlet opening function as guides for the pipe insulation to maintain the pieces of pipe insulation 62 in proper alignment with the foam coating supply nozzles and the wiper blades or brushes within the coating chamber as the pieces of pipe insulation pass through the coating chamber 28.

As shown in FIG. 8 the coating chamber 28 is provided with upper and lower sets of foam supply nozzles 72 and 74 for introducing the polymeric latex foam coating material 46 into the upper and lower portions of the coating chamber at locations above and below the path of the pieces of pipe insulation 62 through the coating chamber. Thus, as with the first embodiment of FIGS. 1 to 5, the coating chamber is maintained fully charged with the polymeric latex coating material 46 and the pieces of pipe insulation 62 are thereby totally immersed within the foam coating material as the pieces of pipe insulation pass through the coating chamber so that both the upper and the lower exterior surfaces 68 and 70 of the pipe insulation are thoroughly coated with a layer of the polymeric latex foam. The upper set of foam supply nozzles 72 is supplied with the foam coating material through supply line 38 and the lower set of foam supply nozzles 74 is supplied with the foam coating material through supply line 40. As with the embodiment of FIGS. 1 to 5, a single upper and a single lower foam supply nozzle can be used to fully charge the upper and lower portions of the coating chamber with the foam coating material to fully immerse the pieces of pipe insulation within the foam coating material as the pieces of pipe insulation pass through the coating chamber 28.

FIG. 9 shows a first set of brushes 76, with flexible plastic or wire bristles, located within the coating chamber 28 downstream of the polymeric latex foam supply nozzles 72 and 74 and adjacent the outlet opening. The free edges of the brushes 76, which contact the permeable exterior surfaces of the molded fibrous pipe insulation pieces 62, have a configuration complementary to the transverse configuration of the pipe insulation pieces and function to evenly disperse or spread the polymeric foam coating material over the entire permeable exterior surfaces of the pipe insulation pieces. As shown, the first set of brushes 76 comprises an upper brush and a lower brush which engage the upper and lower portions 68 and 70 of the permeable exterior surfaces of the pipe insulation pieces 62. As with the embodiment of FIGS. 1 to 5, a flexible wiper blade of rubber or a similar flexible material, having a contour complementary to the transverse configuration of the permeable exterior surfaces of the pipe insulation pieces, can be used in place of the brushes 76 to evenly disperse or spread the polymeric foam coating material 46 over the permeable exterior surfaces of the pipe insulation pieces.

As in the embodiment of FIGS. 1 to 5, a second set of brushes or wiper blades is located outside of the coating chamber 28 and adjacent the outlet opening. The brushes or wiper blades are the same as the brushes or wiper blades 76 within the coating chamber. The second set of brushes or wiper blades functions to smooth out the surface of the polymeric latex coating 60 on the pipe insulation 62.

Unlike the flat workpiece belt conveyors 30 and 32 of the first embodiment, the conveyors 78 for feeding the pipe insulation pieces 62 into and taking the pipe insulation pieces away from the coating chamber 28 comprise a pair of laterally inclined belt conveyors 80 and 82 which form a trough to maintain the pipe insulation pieces in alignment with the inlet and outlet openings of the coating chamber. The conveyor located downstream of the coating chamber is shown in FIG. 10. However, the conveyor located upstream of the coating chamber 28 is the same as the downstream conveyor.

FIG. 11 shows a transverse cross section of a pipe insulation piece 62 which has been coated by the method and with the apparatus of the present invention. The pipe insulation pieces 62 can be made of glass fibers, ceramic fibers, mineral wool fibers or other fibrous materials. In addition to coating pipe insulation and other tubular fibrous workpieces, the embodiment of the present invention described in connection with FIGS. 7 to 10 can be used to coat the exterior surfaces of solid cylindrical fibrous workpieces. As shown, the pipe insulation 62 has a smooth, uniform polymeric latex coating 60 over both the upper and lower portions of its permeable exterior surface to encapsulate any loose fibers and dust within the pipe insulation.

Figure 12:
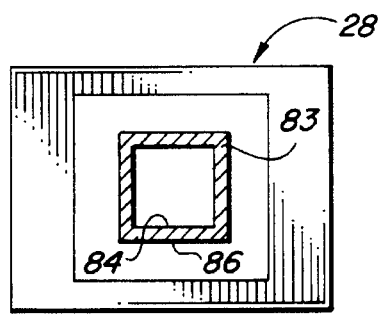
FIG. 12 is a section taken substantially along lines A—A of FIG. 2 to illustrate the inlet opening used when coating a workpiece having a rectangular transverse cross section.
Figure 13:
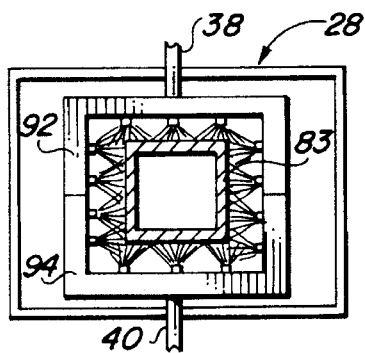
FIG. 13 is a section taken substantially along lines B—B of FIG. 2 to illustrate an arrangement of the polymeric foam coating supply nozzles for a workpiece having a rectangular transverse cross section.
Figure 14:
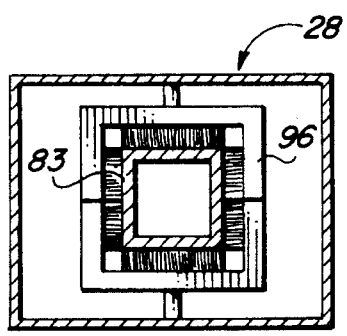
FIG. 14 is a section taken substantially along lines C—C of FIG. 2 to illustrate an arrangement of the wiper blades or brushes within the coating chamber when coating a workpiece having a rectangular transverse cross section.

FIGS. 12 to 14 show the apparatus of FIGS. 1 and 2, modified to coat workpieces 83 having rectangular transverse cross sections. As shown in FIG. 12, the inlet opening 84 of the coating chamber 28 has a rectangular configuration. The sheet metal edges 86 defining the inlet opening 84 are rounded or encased in a rubber gasket to ensure that the rectangular fibrous workpieces 83 are not caught on or damaged by the edges of the inlet opening 84 as the rectangular workpieces pass through the inlet opening into the coating chamber 28. The outlet opening (not shown) has the same configuration and dimensions as the inlet opening 84, the edges of the outlet opening are either rounded or provided with a gasket so that the rectangular workpieces 83 are not damaged by or caught on the edges of the opening as the pieces pass through the outlet opening and out of the coating chamber 28. The inlet opening 84 and the outlet opening conform to the transverse configuration of the exterior surfaces of the rectangular workpieces with dimensions substantially the same as but somewhat greater than the dimensions of the rectangular workpieces. Thus, as with the other two embodiments described above, any leakage of the polymeric latex foam coating material 46 out through the inlet opening or the outlet opening is minimized. In addition, the spacing between the inlet opening and the outlet opening relative to the lengths of the rectangular workpieces is such that the inlet opening and the outlet opening function as guides for the rectangular workpieces to support and maintain the rectangular fibrous workpieces 83 in proper alignment with the foam coating supply nozzles and the wiper blades or brushes within the coating chamber 28 as the rectangular workpieces pass through the coating chamber.

As shown in FIG. 13, the coating chamber 28 is provided with upper and lower sets of foam supply nozzles 92 and 94 for introducing the polymeric latex foam coating material 46 into the upper and lower portions of the coating chamber at locations above and below the path of the workpieces 83 through the coating chamber. Thus the coating chamber is maintained fully charged with the polymeric latex coating material 46 and the fibrous rectangular workpieces 83 are thereby totally immersed within the foam coating material as the workpieces pass through the coating chamber so that both the upper and lower portions 88 and 90 of the permeable exterior surfaces of the workpieces 83 are thoroughly coated with a layer of 60 of the polymeric latex foam coating material.

As shown in FIG. 13, the upper set of nozzles 92 is supplied with foam coating material through supply line 38 and the lower set of supply nozzles 94 is supplied with foam coating material through supply line 40. As shown, the upper and lower sets of supply nozzles are mounted in configurations that generally conform to the exterior surfaces of the rectangular workpieces. However, provided the coating chamber 28 is fully charged with the polymeric latex coating material 46 so that the rectangular workpieces are totally immersed in the foam coating material, the sets of nozzles can be arranged in other configurations or a single upper and a single lower supply nozzle can be used to introduce the polymeric latex foam coating material into the coating chamber.

FIG. 14 shows a first set of brushes 96, with flexible plastic or wire bristles, located within the coating chamber 28 downstream of the foam supply nozzles 92 and 94 and adjacent the outlet opening. The free edges of the brushes 96 which contact the permeable exterior surfaces of the molded fibrous rectangular workpieces 83 have a configuration complementary to the transverse configuration of the workpieces and function to evenly disperse or spread the foam coating material over the entire permeable exterior surfaces of the workpieces. As shown, the first set of brushes 96 comprises an upper brush and a lower brush which engage the upper and lower portions 88 and 90 of the permeable exterior surfaces of the workpieces 83. As with the other embodiments, flexible wiper blades can be used in place of the brushes and a second set of brushes or wiper blades is located outside of the coating chamber and adjacent the outlet opening. As with the other embodiments, the second set of brushes or wiper blades functions to smooth out the surface of the polymeric latex coating 60 on permeable exterior surfaces of the rectangular workpieces 83.

Figure 15:
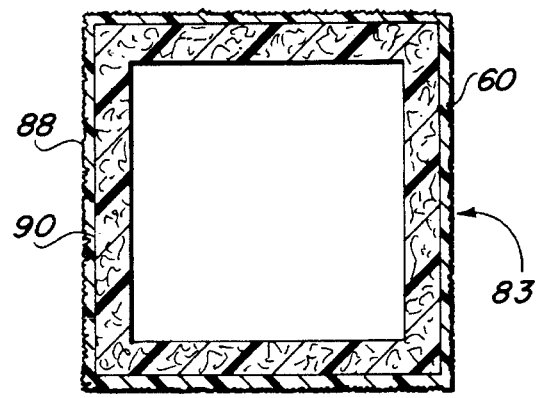
FIG. 15 is a transverse cross section of a workpiece having a rectangular cross section that has been coated by the method and apparatus of the present invention.

FIG. 15 shows a transverse cross section of a fibrous rectangular workpiece 83 which has been coated by the method and with the apparatus of the present invention. As with the other molded fibrous workpieces, the workpiece 83 can be made of fiber glass, ceramic fibers, mineral wool fibers or other fibrous materials. In addition to coating the exterior surfaces of tubular rectangular workpieces, the embodiment of the present invention shown and described in connection with FIGS. 12 to 14 can be used to coat the permeable exterior surfaces of solid rectangular workpieces, such as, fibrous board products. The molded, fibrous rectangular workpiece 83 has a smooth, uniform polymeric latex coating 60 over both the upper and lower portions 88 and 90 of the permeable exterior surfaces of the workpiece to encapsulate any loose fibers and dust within the surfaces of the workpiece.

In all of the embodiments of the present invention, the molded, fibrous workpieces are fed into the coating chamber 28 by the upstream conveyor with successive workpieces pushing preceding workpieces through the coating chamber. As the workpieces enter the coating chamber through the inlet opening, the workpieces are totally immersed in the polymeric latex foam coating material 46 which is maintained at a level within the coating chamber at least above the upper edges of the inlet and outlet openings and preferably at a level to completely fill the coating chamber. By locating the foam supply nozzles both above and below the path of the workpieces, the polymeric latex foam coating material, which has a consistency approximating the consistency of shaving cream, is introduced into the coating chamber both above and below the workpieces to assure that the workpieces do not block the flow of the relatively high viscosity foam coating material to all portions of the coating chamber.

The first and second sets of brushes or wiper blades evenly distribute or spread the foam coating material over the permeable exterior surfaces of the workpieces to more effectively wet out the permeable exterior surfaces of the workpieces with the coating material; to minimize trapped air on the permeable exterior surfaces of the workpieces which can cause blisters to form in the coating; to encapsulate fibers and dust in the permeable exterior surfaces of the workpieces; and to smooth out the surfaces of the coatings formed on the workpieces as the workpieces pass through the coating chamber and are delivered to the downstream conveyor. Since the outlet opening has a configuration complementary to the transverse cross sectional configurations of the exterior surfaces of the workpieces, the outlet opening also spreads the polymeric foam coating material over the exterior surfaces of the workpieces and forms a smooth surface on the coating material. After the workpieces exit the coating chamber 28, the polymeric latex foam coating 60 is cured under ambient conditions or is passed through a conventional oven, not shown, to effect a more rapid cure of the polymeric latex coating.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of coating a molded fibrous workpiece comprising:

passing a molded fibrous workpiece through a coating chamber;

guiding said molded fibrous workpiece along a path through said coating chamber by means of an inlet opening and an outlet opening which each have an edge configuration which substantially conforms to a transverse configuration of said molded fibrous workpiece;

applying a coating of polymeric foam to a permeable exterior surface of said molded fibrous workpiece by passing said molded fibrous workpiece through and totally immersing said molded fibrous workpiece in a polymeric foam coating material contained within said coating chamber;

introducing said polymeric foam coating material into said coating chamber at locations above and below said path of said molded fibrous workpiece through said coating chamber to assure that said molded fibrous workpiece is totally immersed within said polymeric foam coating material;

spreading said coating of polymeric foam over said permeable exterior surface of said molded fibrous workpiece with a wiping means having a wiping edge that substantially conforms to the transverse configuration of said permeable exterior surface of said molded fibrous workpiece to wet out said permeable exterior surface of said molded fibrous workpiece with said polymeric foam coating material, to remove trapped air on said permeable exterior surface of said molded fibrous workpiece which can cause blisters to form in said polymeric foam coating material, and to form a polymeric coating to encapsulate fibers and dust within said permeable exterior surface of said molded fibrous workpiece; and curing said polymeric coating.

2. The method of claim 1, wherein: said spreading of said polymeric foam coating with said wiping means is performed prior to said molded fibrous workpiece passing from said coating chamber.

3. The method of claim 2, including: smoothing a surface of said polymeric coating with a second wiping means having a wiping edge substantially conforming to the transverse configuration of said permeable exterior surface of said molded fibrous workpiece.

4. The method of claim 3, wherein: said second wiping means is located outside of said coating chamber.

5. The method of claim 1, wherein: said outlet opening spreads said polymeric foam coating material over said permeable exterior surface of said workpiece and forms a smooth surface on said polymeric foam coating material.

* * * * *